United States Patent [19]

Terui

[11] Patent Number: 5,740,471
[45] Date of Patent: Apr. 14, 1998

[54] CAMERA SHAKE COMPENSATION DEVICE

[75] Inventor: Nobuhiko Terui, Ichikawa, Japan

[73] Assignee: Nikon Corporation, Tokyo, Japan

[21] Appl. No.: 848,052

[22] Filed: Apr. 29, 1997

Related U.S. Application Data

[63] Continuation of Ser. No. 681,494, Jul. 23, 1996, abandoned, which is a continuation of Ser. No. 481,158, Jun. 7, 1995, abandoned, which is a continuation of Ser. No. 181,974, Jan. 18, 1994, abandoned, which is a continuation of Ser. No. 32,539, Mar. 17, 1993, abandoned, which is a continuation of Ser. No. 835,576, Feb. 14, 1992, abandoned.

[30] Foreign Application Priority Data

Mar. 6, 1991 [JP] Japan ................................. 3-039869

[51] Int. Cl.$^6$ ................................................ G03B 5/00
[52] U.S. Cl. ................................................ 396/53; 396/55
[58] Field of Search ........................ 396/52–55; 348/208; 359/554

[56] References Cited

U.S. PATENT DOCUMENTS

| | | | |
|---|---|---|---|
| 5,099,694 | 3/1992 | Sumio et al. | 73/654 |
| 5,107,293 | 4/1992 | Sekine et al. | 354/430 |
| 5,109,249 | 4/1992 | Kitajima | 354/430 |
| 5,117,246 | 5/1992 | Takahashi et al. | 354/430 X |

*Primary Examiner*—W. B. Perkey
*Attorney, Agent, or Firm*—Shapiro and Shapiro

[57] ABSTRACT

A camera anti-shaking device has an optical shake detection device which uses an optical sensor and a mechanical shake detection device which uses a mechanical sensor, and selectively uses the outputs of both detection devices in accordance with a situation to compensate the shake. The anti-shake device includes shake compensation means for compensating the shake in response to the output from the shake detection device, and shake calculation output switching means for selecting the output produced by the mechanical sensor for supplying it to the shake compensation means when the detection of the shake is not attainable by the optical sensor.

30 Claims, 5 Drawing Sheets

CAMERA SHAKE COMPENSATION DEVICE

This is a continuation of Application No. 08/681,494 filed Jul. 23, 1996, which is a continuation of Application No. 08/481,158 filed Jun. 7, 1995, which is a continuation of Application No. 08/181,974 filed Jan. 18, 1994, which is a continuation of Application No. 08/032,539 filed Mar. 17, 1993, which is a continuation of Application No. 07/835,576 filed Feb. 14, 1992, all of which are abandoned.

BACKGROUND OF THE INVENTION

1. Field of the Invention

The present invention relates to an anti-shaking device for camera shake.

2. Related Background Art

An optical detection method and a mechanical detection method have been known to detect camera shake.

In the optical detection method, a two-dimension image sensor or a plurality of one-dimension image sensors are used to detect a positional displacement of an object image by the shake.

The mechanical detection method includes an acceleration detection method in which an acceleration of the shake when a camera body is shaked is detected to calculate the positional displacement of the object image based on the acceleration, and an angular velocity detection method in which an angular velocity of the shake when the camera body is shaked is detected to calculate the positional displacement of the object image based on the angular velocity.

When the optical shake detection method is applied to the camera, it is necessary in a one-eye reflex type camera to drive a mirror up immediately before a photograph is taken so that all lights through an objective lens are directed to a film when the photograph is taken. As a result, in the optical shake detection method, the shake can be detected until immediately before the photographing but cannot be detected during the photographing.

When the mechanical shake detection method is applied to the camera, in the acceleration detection method, the shake cannot be detected during a constant velocity motion even if the shake is large, because it detects only the acceleration. Further, if a period of shake is long (a frequency of shake is low), the acceleration is low even if the shake is large, and the detected acceleration is small and a detection error is large.

In the angular velocity detection method, a high precision gyroscope (for example, a laser gyroscope) used as a detector is large in size and expensive, and an inexpensive one is of low precision and difficult to determine if the velocity is zero or not. Further, when the period of shake is long (the frequency of shake is low), the angular velocity is low even if the shake is large, and the detected velocity is low and the detection error is large.

SUMMARY OF THE INVENTION

It is an object of the present invention to provide a camera anti-shaking device for compensating the shake before and during the photographing by using both an optical shake detection device and a mechanical shake detection device.

In order to achieve the above object, the present invention is provided with shake calculation output switching means which selects an output produced by optical shake calculation means when a photograph is not taken or an output level of an optical sensor is higher than a predetermined level, and selects an output produced by mechanical calculation means during the photographing or the output level of the optical sensor is lower than the predetermined level.

The present invention is further provided with calculation output modification means which calculates a shake velocity based on the output produced by the optical shake calculation means and modifies the output produced by the mechanical shake calculation means based on the detection by the mechanical sensor when the calculated shake velocity is lower than a predetermined level.

In accordance with the present invention, the shake can be calculated under any circumstance to compensate the shake by the provision of the calculation output switching means which selects the output produced by the optical shake calculation means when the photograph is not taken or when the output level of the optical sensor is higher than the predetermined level, and selects the output produced by the mechanical shake calculation means which detects the acceleration or the angular velocity and calculates the shake based thereon during the photographing or when the output level of the optical sensor is lower than the predetermined level.

In accordance with the present invention, the detection precision of the mechanical shake calculation means which is lower than that of the optical shake calculation means can be compensated the provision of the calculation output modification means which modifies the output of the mechanical shake calculation means based on the output shake calculation means when the shake velocity detected by the optical shake calculation means is lower than the predetermined level.

DETAILED DESCRIPTION OF THE PREFERRED EMBODIMENTS

Figure 1:
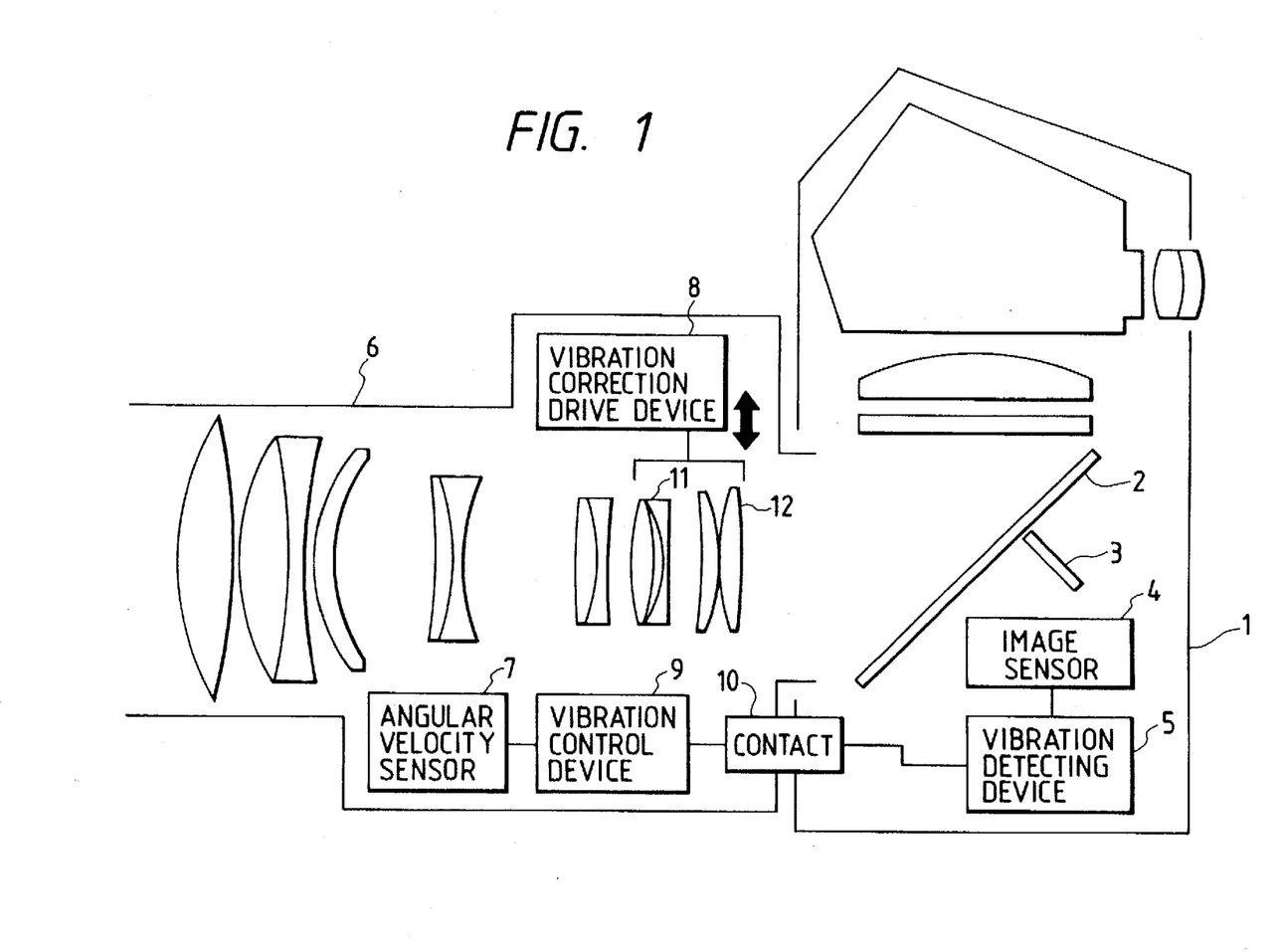
FIG. 1 shows a configuration and a block diagram of one embodiment of the present invention.

FIG. 1 shows a configuration and a block diagram of a first embodiment of a camera in accordance with the present invention.

A main mirror 2 and sub-mirror 3 are mounted in a camera body 1. The main mirror 2 is a half-mirror, and a light beam from a lens barrel 6 is directed by the sub-mirror 3 to an image sensor 4 which detects shake. The image sensor 4 is positioned at a distance which is equal to a distance from the sub-mirror 3 to a film surface, and detects an object image. An output of the image sensor 4 is sent to a shake detector 5 which calculates a positional displacement (shake X) of the object image based on the output sent from the image sensor 4 and supplies the calculated shake to a shake control unit 9 arranged in a lens barrel 6 through a contact 10. When the shake detector 5 receives a mirror drive-up signal from a release control circuit (not shown) or when an output level from the image sensor 4 is lower than a predetermined level, it sends a detection disable signal to the shake control unit 9.

One angular sensor 7 for detecting the shake is arranged in the lens barrel 6 along a vertical axis of the lens barrel 6 and another angular sensor 7 is arranged along a horizontal axis. Outputs of the angular sensors 7 are sent to the shake control unit 9. A pair of shake compensation drivers 8 are arranged along the vertical axis of the lens barrel 6 and another pair of shake compensation drivers 8 are arranged along the horizontal axis. The shake compensation drivers 8 drive shake compensation lenses 11 and 12 in accordance with the outputs from the shake control unit 9. When the shake control unit 9 does not receive the detection disable signal from the shake detector 5, it supplies drive signals to the shake compensation drivers 8 in accordance with the positional displacement (shake amplitude X) of the object image supplied from the shake detector 5 through the contact 10, and when it receives the detection disable signal from the shake detector 5, if calculates the shake X based on the output of the angular velocity sensor 7 by a formula (3) to be described later, and supplies the drive signals to the shake compensation drivers 8 in accordance with the calculated shake amplitude.

Figure 2:
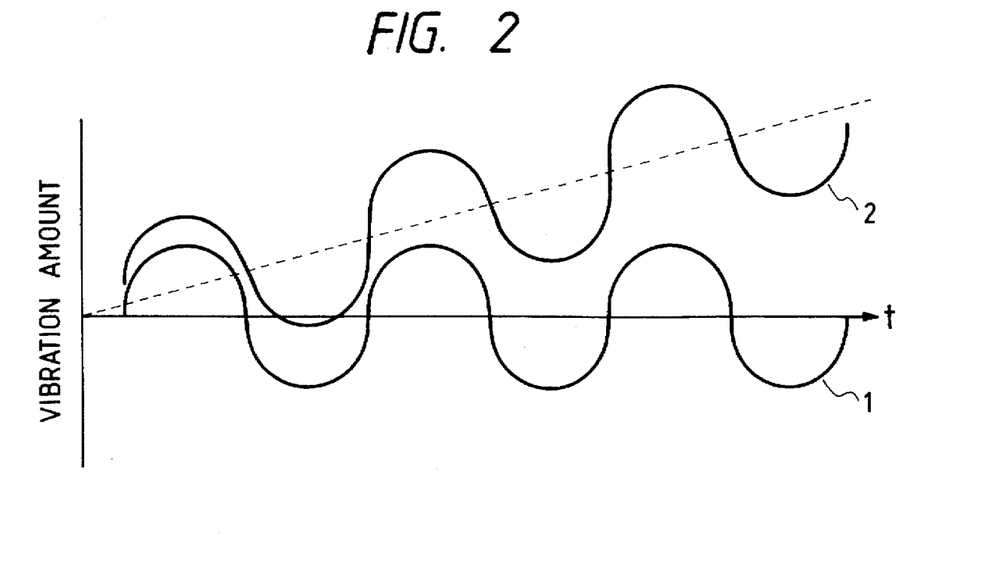
FIG. 2 shows waveforms of a motion of an object as determined by a camera body and a motion of the camera body as determined by an angular velocity sensor 7 in the anti-shaking device of the embodiment, in which a waveform 1 shows an output waveform of a shake amplitude X produced by a shake detector 5, and a waveform 2 shows an output waveform of the shake amplitude X produced by an angular velocity sensor 7.

FIG. 2 shows waveforms of a motion of the object image as determined by a camera body and a motion of the camera body as determined by the angular sensor 7. A waveform 1 shows an output waveform of the shake amplitude X from the shake detector 5, and a waveform 2 shows an output waveform of the shake amplitude X calculated based on the output of the angular velocity sensor 7.

The shake amplitude X of the image on the film surface is generally given by:

$$X = f\theta$$

where $\theta$ is an angular change of the image to the optical axis due to the shake, and f is a focal length of the lens.

Accordingly, the angular velocity $\omega$ and the shake amplitude X have the following relation:

$$Xf = f\int \omega \, dt \qquad (1)$$

When the output of the angular velocity sensor 7 includes an offset $\delta$ to be described later, the shake amplitude X is given by:

$$Xf = f\int (\omega + \delta) dt$$

$$f = f\int \omega \, dt + f \cdot \delta \cdot t \qquad (2)$$

Thus, an error increases in proportion to the time.

If the shake velocity is zero, the detection by the angular velocity sensor 7 is to be zero, but a definite value other than zero may sometimes be detected. Such a detection is called the offset of the angular velocity sensor 7.

When the angular velocity sensor 7 includes a positive offset, the offset $\delta$ is integrated in the calculation of the shake amplitude X. As a result, an error $(f\cdot\delta\cdot t)$ which is proportional to the time is added to the shake amplitude X and the waveform 2 rises as it goes toward a right end. (If the offset is negative, the error of the shake amplitude X is $-(f\cdot\delta\cdot t)$ and the waveform 2 falls as it goes toward the right end.

Figure 3:
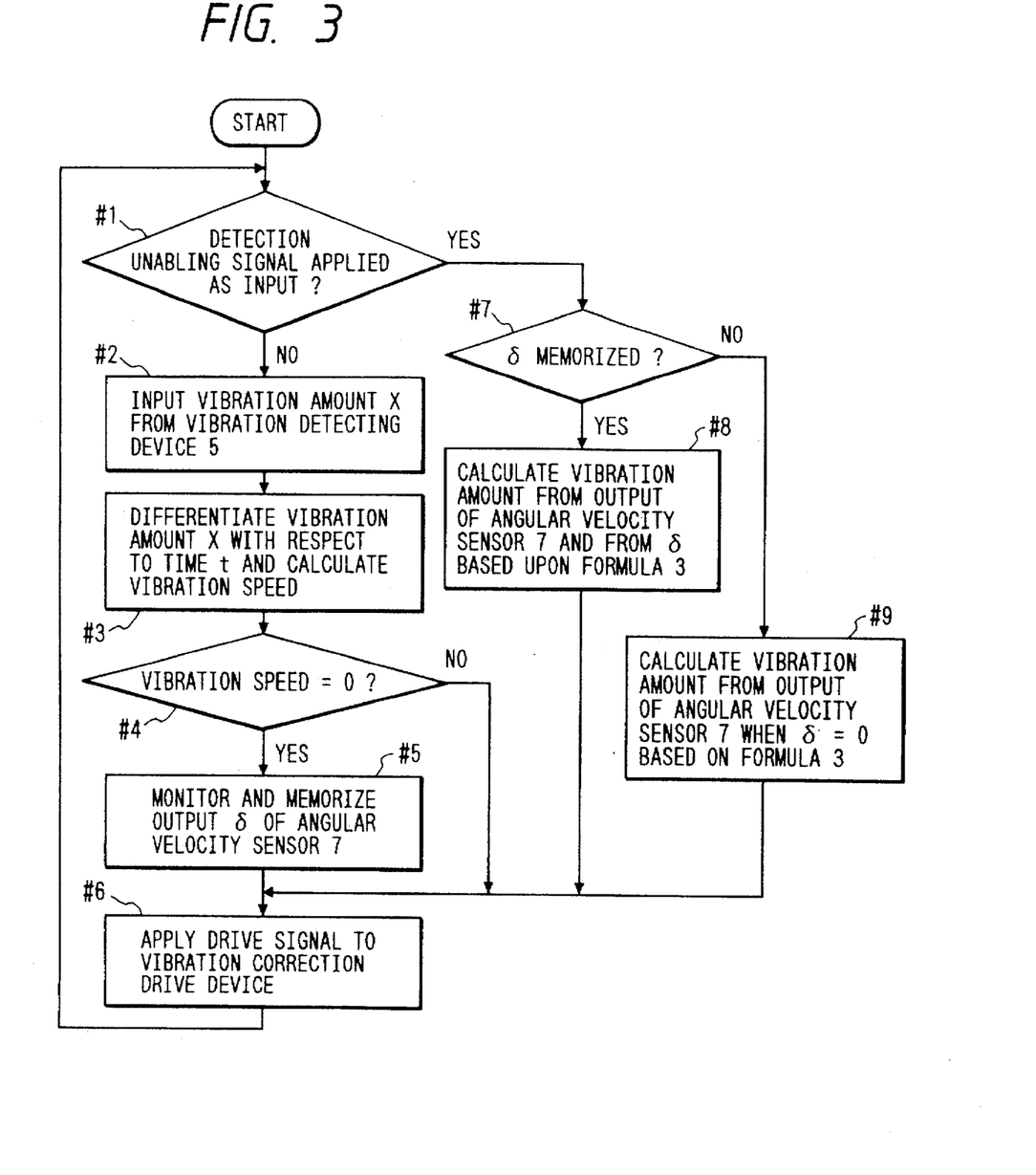
FIG. 3 shows a flow chart of an operation of a CPU in a shake control unit 9 of the embodiment.

FIG. 3 shows a flow chart of an operation of a CPU in the shake control unit 9. In the present embodiment, when the detection of the shake by the optical shake detection device is not permitted during the photographing or when an environmental brightness is low, the output of the mechanical shake detection device which calculates the shake amplitude X by detecting the angular velocity is used. Further, in the present embodiment, the angular velocity sensor of the mechanical shake detection device detects the angular velocity even when the shake is compensated by using the optical shake detection device. The flow chart of FIG. 3 is explained below.

When a power switch (not shown) is turned on, the flow is started.

In a step 1, whether the output level from the image sensor is low than the predetermined level because of a low environmental brightness, the detection disable signal indicating the detection of the shake amplitude X is disabled is produced by the shake detector 5 and it is supplied to the shake control unit 9 or not is determined. If it has been supplied, the process proceeds to a step 7, and if it has not been supplied, the process proceeds to a step 2. The detection disable signal is produced not only when the environmental brightness is low but also when a release button (not shown) is fully depressed to turn on a release switch (not shown).

In the step 2, the shake amplitude signal X produced by the shake detector 5 is received through the contact 10.

In a step 3, the shake amplitude X supplied in the step 2 is differentiated by time to calculate a shake velocity.

In a step 4, whether the shake velocity calculated in the step 3 is zero or not is determined. If the shake velocity when the shake amplitude is inputted is zero (that is, the shake amplitude is zero), the offset $\delta$ of the angular velocity sensor 7 is checked in a step 5, and if the shake velocity is not zero, the process proceeds to a step 6.

In the step 5, the output of the angular velocity sensor 7 is monitored and the output $\delta$ is stored. The stored value $\delta$ is used as the offset of the angular velocity sensor 7. Each time the zero speed is detected in the step 4, the stored offset is updated. Thus, the shake amplitude X can always be calculated by a formula (3) to be described later with the latest offset $\delta$.

In a step 7, whether the offset $\delta$ has been calculated and stored in the step 5 or not is determined. If it has been stored, the process proceeds to a step 8, and if it has not been stored, the process proceeds to a step 9.

In the step 8, an angular velocity which is the output of the angular velocity sensor 7 less the offset $\delta$ stored in the step 5 is integrated by time t as shown by the formula 3 to calculate the shake amount X. Then, the process proceeds to the step 6.

In the step 9, the output (angular velocity) of the angular velocity sensor 7 is integrated by time t as shown in the formula (3) with $\delta=0$ to calculate the shake amplitude X. Then, the process proceeds to the step 6.

$$X = f\int (\omega_s + \delta) dt \qquad (3)$$

where $\omega_s$ is the angular velocity detected by the angular velocity sensor 7.

The angular velocity $\omega_s$ detected by the angular velocity sensor 7, the actual angular velocity $\omega$ and the offset $\delta$ have the following relationship:

$$\omega_s = \omega + \delta$$

In the step 6, if the detection disable signal has not been received in the step 1, a drive signal is supplied to the shake compensation driver 8 in accordance with the shake amplitude X received in the step 2, and the process returns to the step 1. If the detection disable signal has been received in the step 1, a drive signal is supplied to the shake compensation driver 8 in accordance with the shake amplitude X calculated in the step 8 or 9, and the process returns to the step 1.

The process of receiving or calculating the shake amplitude X and supplying the drive signal to the shake compensation driver 8 in accordance with the shake amplitude X is repeated until the power switch ( not shown ) is turned off.

Figure 4:
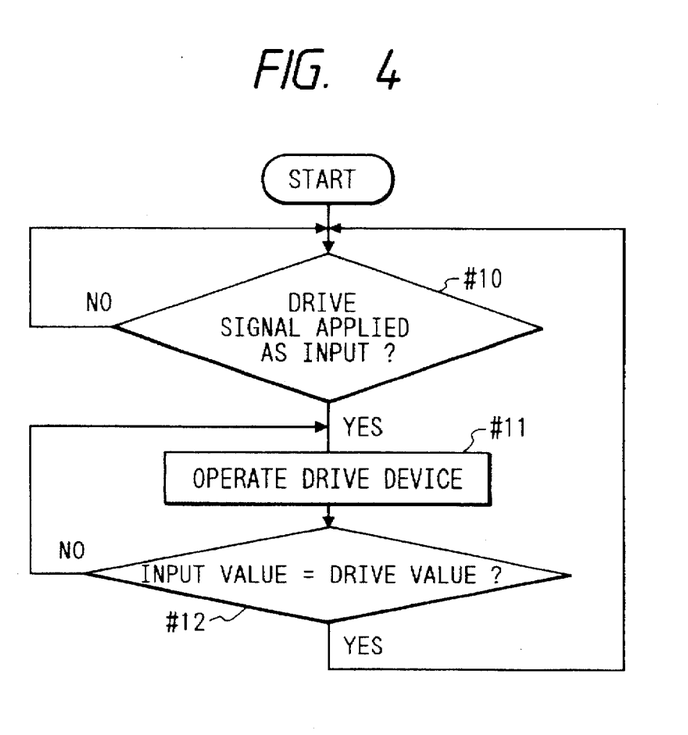
FIG. 4 shows a flow chart of an operation of a CPU in a shake compensation unit 8 of the embodiment and a modification thereof.

FIG. 4 shows a flow chart of an operation of a CPU in the shake compensation driver 8.

Like the flow chart of the shake control unit 9 shown in FIG. 3, the flow is started when the power switch ( not shown ) is turned on.

In a step 10, whether the drive signal from the shake control unit 9 has been received or not is determined. If it has been received, the process proceeds to a step 11, and if it has not been received, the process waits for the input of the drive signal.

In the step 11, the shake compensation lenses 11 and 12 are driven in accordance with the input drive signal.

In a step 12, whether the input and the drive signal used to drive the shake compensation lenses 11 and 12 in the step 11 are equal or not is determined. If the input and the drive signal are equal and the shake compensation has been completed, the process returns to the step 10. If the input and the drive signal are not equal and the shake compensation has not been completed, the process returns to the step 11 where the shake compensation lenses 11 and 12 are driven until the shake compensation is completed.

A second embodiment of the present invention is now explained. A difference between the second embodiment and the first embodiment lies in the use of an angular acceleration sensor (not shown) in place of the angular velocity sensor. Since the angular acceleration sensor is less expensive than the angular velocity sensor, it is easier to implement from a cost standpoint. The configuration and block diagram of the second embodiment are same as those of the first embodiment except that the angular velocity sensor 7 has been substituted by the angular acceleration sensor (not shown).

Figure 5:
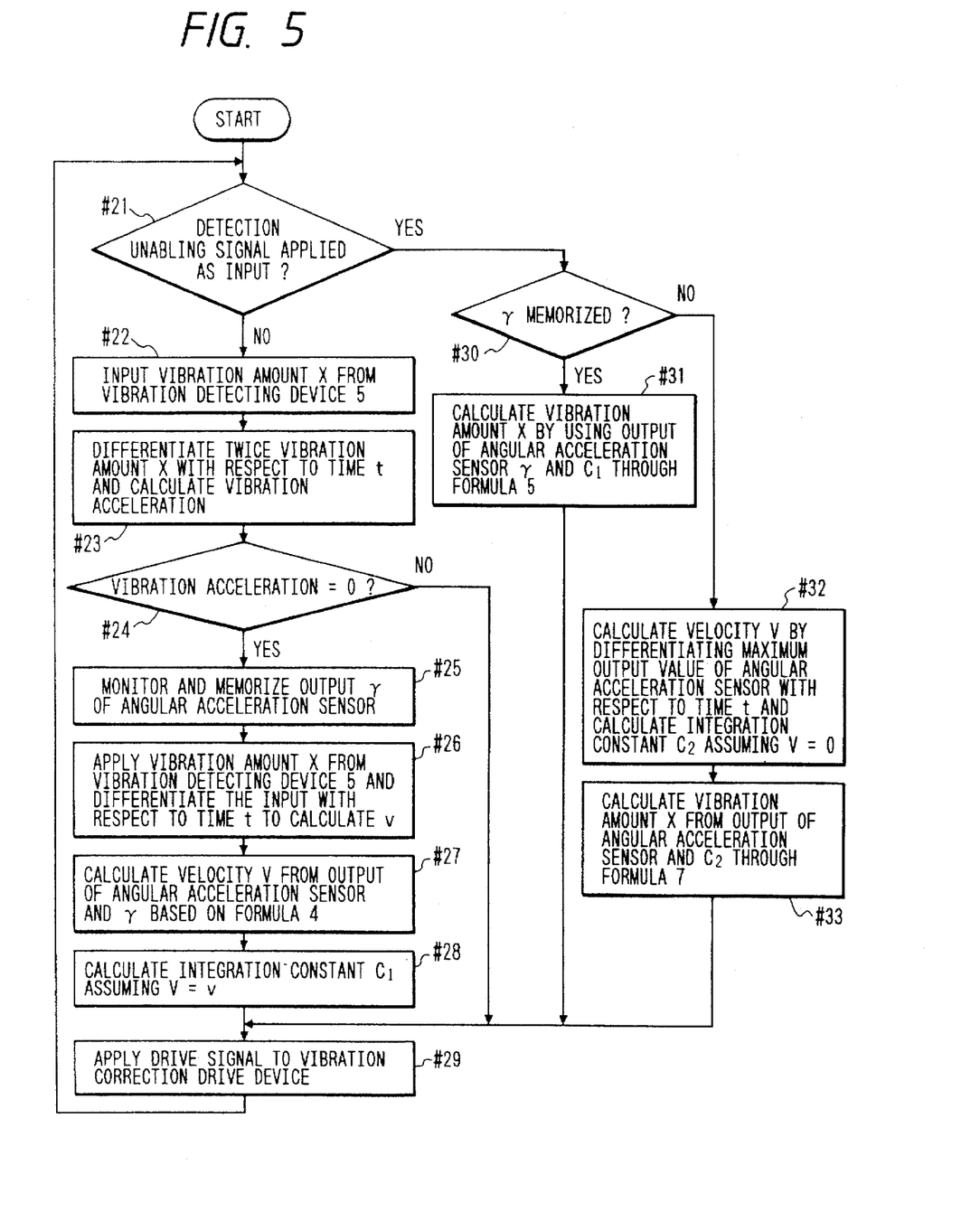
FIG. 5 shows a flow chart of an operation of a CPU in a shake control unit 9 of the modification.

FIG. 5 shows a flow chart of an operation of a CPU in the shake control unit 9. The flow chart of FIG. 5 is explained below.

The flow from the start to the step 22 is same as that from the start to the step 2 in FIG. 3, and the explanation thereof is omitted.

In a step 23, the shake amplitude X inputted in the step 22 is differentiated by time t twice to calculate the shake angular acceleration.

In a step 24, whether the shake angular acceleration calculated in the step 23 is zero or not is determined. If the shake angular acceleration when the shake amplitude X was received is zero, the offset γ of the angular acceleration sensor is checked in the step 25. If the shake angular acceleration is not zero, the process proceeds to a step 29.

In the step 25, the output of the angular acceleration sensor is monitored and the output γ thereof is stored. The stored value γ is used as the offset of the angular acceleration sensor. In the step 25, each time the offset γ is monitored, the offset is stored to update the stored offset. In this manner, the shake amplitude X can be calculated by a formula (5) to be described later with the offset γ which complies with a photographing condition for each photographing.

In a step 26, the shake amplitude X is received from the shake detector 5, and the shake amplitude X is differentiated by time t to calculate a shake velocity v from the detection output of the shake detector 5.

In a step 27, the shake angular acceleration is integrated by time t as shown by the formula (4) by using the output of the angular acceleration sensor (not shown) and the offset γ of the angular acceleration sensor stored in the step 25 to calculate the shake velocity v from the detection output of the angular acceleration sensor.

$$V = \int f(a_s - \gamma) dt + C_1 \quad (4)$$

where $a_s$ is the angular acceleration detected by the angular acceleration sensor. The detected angular acceleration $a_s$, the actual angular acceleration a and the offset γ have the following relationship:

$$a_s = a + \gamma$$

In a step 28, the integration constant $C_1$ of the formula (4) is calculated by setting v=V, where v is the velocity calculated in the step 26, and V is velocity calculated in the step 27.

In a step 29, a drive signal is supplied to the shake compensation driver 8 in accordance with the shake amplitude X inputted in the step 22, and the process returns to the step 1.

In a step 30, whether the offset γ has been stored in the step 25 or not is determined. If it has been stored, the process proceeds to a step 31, and if it has not been stored, the process proceeds to a step 32.

In the step 31, the shake velocity V is integrated by time t as shown by the formula (4) by using the output of the angular acceleration sensor (not shown), the offset γ of the angular acceleration sensor stored in the step 25 and the integration constant $C_1$ calculated in the step 28 to calculate the shake amplitude X from a formula (5).

$$\begin{aligned} X &= \int f \cdot v dt \\ &= \int [\int (a_s - \gamma) dt + C_1] \cdot f dt \end{aligned} \quad (5)$$

In the step 32, the angular acceleration is integrated by time t to calculate the velocity, and an integration constant $C_2$ in the velocity formula is calculated in order to calculate the shake amplitude by integrating the velocity formula by time t. The calculation of the integration constant $C_2$ is explained below.

The acceleration a is a function of the time t and is given by $a_s - \gamma = \alpha(t)$. In order to calculate the velocity V, $\alpha(t)$ is integrated by time t:

$$\begin{aligned} X &= \int \alpha(t) dt \\ &= \int (a_s - \gamma) dt + C_2 = A(t) \end{aligned} \quad (6)$$

where A(t) is the integration of $\alpha(t)$ by time t. In order to calculate the velocity V from a time $t_1$ to a time $t_2$, the acceleration $a_s$ is integrated from $t_1$ to $t_2$:

$$V = A(t_2) - A(t_1)$$

Figure 6A:
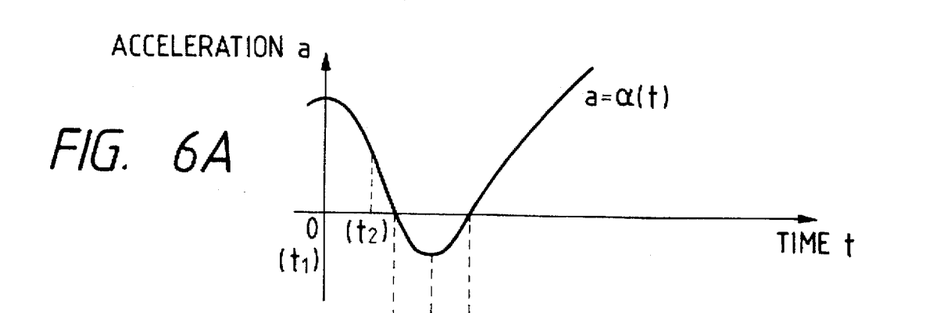
FIG. 6A shows a relationship among a position, a velocity and an acceleration of the shake in the modification.
Figure 6B:
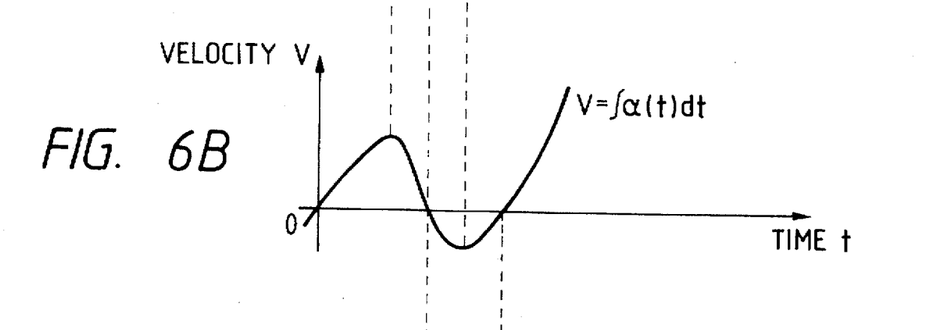
FIG. 6B shows the velocity of the shake in the modification.
Figure 6C:
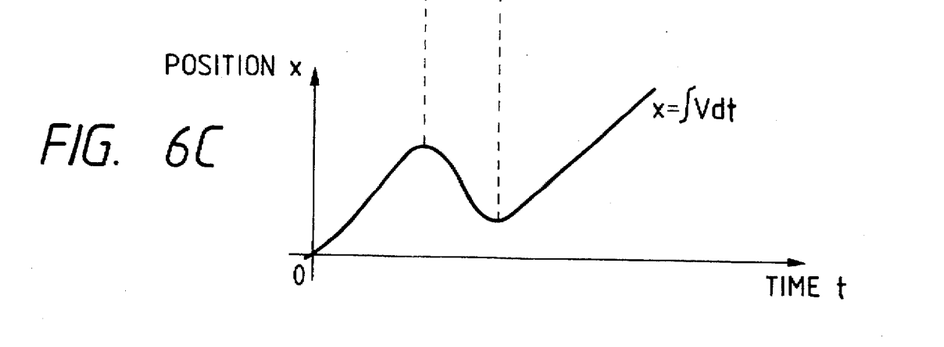
FIG. 6C shows the position of the shake in the modification.

Assuming that the acceleration $\alpha(t_1)$ at the time $t_1$ is a boundary of switching from a positive acceleration to a negative acceleration, relationships among the shake position x, the velocity V and the acceleration a with the time $t_1$ being an origin point (the time $t_1$ is 0) are shown in FIGS. 6A–6C. Since the velocity V is zero as shown in FIG. 6B, $$V=A(t_1)=A(0)=0$$

Thus, the integration constant $C_2$ in the formula (6) of $V=A(t)$ can be calculated.

After the calculation constant $C_2$ has been calculated, the velocity V after the time t=0 can be calculated by putting a desired time t into the formula (6).

In a step 33, the velocity V is integrated by time t as shown by a formula (7) by using the output of the angular acceleration sensor (not shown), the integration constant $C_2$ calculated in the step 32 and γ=0 to calculate the shake amplitude X.

$$\begin{aligned} X &= \int V \cdot f dt \\ &= \int [\int \alpha(t) dt] \cdot f dt \\ &= \int [\int (a_s - \gamma) dt + C_2] \cdot df t \end{aligned} \quad (7)$$

In a step 29, a drive signal is supplied to the shake compensation driver 8 in accordance with the shake amplitude X calculated in the step 31 or 33, and the process returns to the step 1.

The process of inputting or calculating the shake amount X and supplying the drive signal to the shake compensation driver 8 in accordance with the shake amplitude X is repeated by the CPU of the shake control unit 9 until the power switch (not shown) is turned off.

The operation of the CPU in the shake compensation driver 8 of the second embodiment is identical to that of the CPU shown in FIG. 4 in the first embodiment, and the explanation thereof is omitted.

In the first and second embodiments, the detection disable signal is produced by the shake detector 5 not only when the environmental brightness is low but also when the release button (not shown) is fully depressed to turn on the release switch (not shown) so that the shake detector 5 receives the mirror drive-up signal from the release control circuit (not shown).

In the first and second embodiments, when the shake control unit 9 receives the detection disable signal from the shake detector 5, it switches the shake detection output from the detection output of the optical shake detection device to the detection output of the mechanical shake detection device. Alternatively, the mirror drive-up signal produced by the release control circuit (not shown) which indicates the depression of the release button (not shown) may be supplied directly to the shake control unit 9 without routing the shake detector 5 so that the detection output is switched by the mirror drive-up signal.

In accordance with the present invention, the mechanical shake detection device and the optical shake detection device having a better performance than the mechanical shake detection device are used, and the shake is compensated by using the detection output of the optical shake detection device when the optical shake detection device is able to detect the relative positional displacement of the object image, and using the calculated output of the mechanical shake detection device which calculates the shake amplitude while taking the error inherent to the mechanical sensor into consideration when the optical shake detection device is unable to detect the relative positional displacement of the object image. Accordingly, the optimum shake compensation is always attained before and during the photographing.

What is claimed is:

1. A camera anti-shaking device comprising:
   a mechanical sensor for detecting a shake velocity when a camera body is shaker,
   mechanical shake calculation means for calculating a shake amplitude of the camera body based on the detection output of said mechanical sensor;
   an optical sensor for detecting a relative positional displacement of an object due to shake;
   optical shake calculation means for calculating a shake amplitude of the camera body based on the detection output of said optical sensor;
   shake compensation means for relieving an effect by the shake to a photograph image in accordance with the calculation output of said mechanical shake calculation means or said optical shake calculation means; and
   shake calculation output selection means for switching the shake calculation output from the output of said optical shake calculation means to the output of said mechanical shake calculation means when the detection is not attainable by said optical sensor.

2. A camera anti-shaking device according to claim 1, wherein said shake calculation output selection means includes detection inability signal generating means for generating a detection inability signal when the detection is not attainable by said optical sensor, and wherein said shake calculation output selection means performs the switching of the shake calculation output when the detection inability signal is produced.

3. A camera anti-shaking device according to claim 2, wherein said detection inability signal generating means includes mirror-up detection means for detecting if a movable mirror retracts from a phototaking optical path, and for generating a mirror-up signal if the retraction is performed, and wherein said shake calculation output selection means performs the switching of the shake calculation output when said mirror-up signal is produced.

4. A camera-anti shaking device according to claim 2, wherein said detection inability signal generating means includes comparison means for comparing an output level of said optical sensor to a predetermined level, and generating a low level signal if the output level is smaller than the predetermined level, and wherein said shake calculation output selection means performs the switching of the shake calculation output when said low level signal is generated.

5. A camera anti-shaking device according to claim 2, further comprising an operation member which can be operated from the outside for starting a shutter-release operation, and wherein said detection inability signal generating means produces the detection inability signal when said operation member is operated.

6. A camera anti-shaking device comprising:
   a mechanical sensor for detecting a shake acceleration when a camera body is shaker,
   mechanical shake calculation means for calculating a shake amplitude of the camera body based on the detection output of said mechanical sensor;
   an optical sensor for detecting a relative positional displacement of an object due to shake;
   optical shake calculation means for calculating a shake amplitude of the camera body based on the detection output of said optical sensor;
   shake compensation means for relieving an effect by the shake to a photograph image in accordance with the calculation output of said mechanical shake calculation means or said optical shake calculation means; and
   shake calculation output selection means for switching the shake calculation output from the output of said optical shake calculation means to the output of said mechanical shake calculation means when the detection is not attainable by said optical sensor.

7. A camera anti-shaking device according to claim 6, wherein said shake calculation output selection means includes detection inability signal generating means for generating a detection inability signal when the detection is not attainable by said optical sensor, and wherein said shake calculation output selection means performs the switching of the shake calculation output when the detection inability signal is produced.

8. A camera anti-shaking device according to claim 7, wherein said detection inability signal generating means includes mirror-up detection means for detecting if a movable mirror retracts from a phototaking optical path, and for generating a mirror-up signal if the retraction is performed, and wherein said shake calculation output selection means performs the switching of the shake calculation output when said mirror-up signal is produced.

9. A camera anti-shaking device according to claim 7, wherein said detection inability signal generating means includes comparison means for comparing an output level of said optical sensor to a predetermined level, and generating a low level signal if the output level is smaller than the predetermined level, and wherein said shake calculation output selection means performs the switching of the shake calculation output when said low level signal is generated.

10. A camera anti-shaking device according to claim 7, further comprising an operation member which can be operated from the outside for starting a shutter-release operation, and wherein said detection inability signal generating means produces the detection inability signal when said operation member is operated.

11. A camera anti-shaking device comprising:
a mechanical sensor for detecting a shake velocity when a camera body is shaker,
mechanical shake calculation means for calculating a shake amplitude of the camera body based on the detection output of said mechanical sensor;
an optical sensor for detecting a relative positional displacement of an object due to shake;
optical shake calculation means for calculating a shake amplitude of the camera body based on the detection output of said optical sensor;
shake compensation means for relieving an effect by the shake to a photograph image in accordance with the calculation output of said mechanical shake calculation means or said optical shake calculation means; and
calculation output modification means for calculating a shake velocity based on the output of said optical shake calculation means and modifying the calculation output of said mechanical shake calculation means based on the detection output of said mechanical sensor when the calculated shake velocity is lower than a predetermined level.

12. A camera anti-shaking device according to claim 11, wherein said calculation output modification means includes detection inability signal generating means for generating a detection inability signal when the detection is not attainable by said optical sensor, and wherein said calculation output modification means performs the modification of said calculation output when the detection inability signal is produced.

13. A camera anti-shaking device according to claim 11, wherein said calculation output modification means includes memory means for storing the detection output from said mechanical sensor when the calculated shake velocity is lower than the predetermined level.

14. A camera anti-shaking device according to claim 13, further comprising renewing means for renewing the detection output stored in said memory means every time it is determined that the calculated shake velocity is lower than the predetermined level, and wherein said calculation output modification means modifies the calculation output obtained from said mechanical shake calculation means based on the most recent detection output renewed by said renewing means.

15. A camera anti-shaking device according to claim 13, wherein said calculation output modification means modifies the calculation output obtained from said mechanical shake calculation means with the detection output being set to zero if the detection output has not been stored in said memory means.

16. A camera anti-shaking device according to claim 13, wherein said calculation output modification means modifies the calculation output obtained from said mechanical shake calculation means with the detection output being set to zero if the detection output has not been stored in said memory means.

17. A camera anti-shaking device according to claim 11, wherein the calculated shake velocity is lower than the predetermined level when the calculated shake velocity is zero.

18. A camera anti-shaking device comprising:
a mechanical sensor for detecting a shake acceleration when a camera body is shaker,
mechanical shake calculation means for calculating a shake amplitude of the camera body based on the detection output of said mechanical sensor;
an optical sensor for detecting a relative positional displacement of an object due to shake;
optical shake calculation means for calculating a shake amplitude of the camera body based on the detection output of said optical sensor;
shake compensation means for relieving an effect by the shake to a photograph image in accordance with the calculation output of said mechanical shake calculation means or said optical shake calculation means; and
calculation output modification means for calculating a shake acceleration based on the output of said optical shake calculation means and modifying the calculation output of said mechanical shake calculation means based on the detection output of said mechanical sensor when the calculated shake acceleration is lower than a predetermined level.

19. A camera anti-shaking device according to claim 18, wherein said calculation output modification means includes detection inability signal generating means for generating a detection inability signal when the detection is not attainable by said optical sensor, and wherein said calculation output modification means performs the modification of said calculation output when the detection inability signal is produced.

20. A camera anti-shaking device according to claim 18, wherein said calculation output modification means includes memory means for storing the detection output from said mechanical sensor when the calculated shake acceleration is lower than the predetermined level.

21. A camera anti-shaking device according to claim 20, further comprising renewing means for renewing the detection output stored in said memory means every time it is determined that the calculated shake acceleration is lower than the predetermined level, and wherein said calculation output modification means modifies the calculation output obtained from said mechanical shake calculation means based on the most recent detection output renewed by said renewing means.

22. A camera anti-shaking device according to claim 18, wherein the calculated shake acceleration is lower than the predetermined level when the calculated shake acceleration is zero.

23. A camera anti-shaking device comprising:
   a mechanical sensor for detecting a shake velocity when a camera body is shaken;
   mechanical shake calculation means for calculating a shake amplitude of the camera body based on the detection output of said mechanical sensor;
   an optical sensor for detecting a relative positional displacement of an object due to shake;
   optical shake calculation means for calculating a shake amplitude of the camera body based on the detection output of said optical sensor; and
   shake compensation means for relieving an effect by the shake to a photograph image in accordance with the calculation output of a selected one of said mechanical shake calculation means and said optical shake calculation means.

24. A camera anti-shaking device according to claim 23, wherein said optical sensor and said optical shake calculation means are provided in the camera body.

25. A camera anti-shaking device comprising:
   a mechanical sensor for detecting a shake acceleration when a camera body is shaken;
   mechanical shake calculation means for calculating a shake amplitude of the camera body based on the detection output of said mechanical sensor;
   an optical sensor for detecting a relative positional displacement of an object due to shake;
   optical shake calculation means for calculating a shake amplitude of the camera body based on the detection output of said optical sensor; and
   shake compensation means for relieving an effect by the shake to a photograph image in accordance with the calculation output of a selected one of said mechanical shake calculation means and said optical shake calculation means.

26. A camera anti-shaking device according to claim 25, wherein said optical sensor and said optical shake calculation means are provided in the camera body.

27. A method of camera shake compensation, comprising:
   detecting a shake velocity when a camera body is shaken;
   determining whether it is possible for relative positional displacement detection means of the camera to detect relative positional displacement of an object to be photographed due to shake of the camera body;
   if it is determined that such displacement can be detected, detecting such displacement, calculating the shake amplitude of the camera body based on the detected displacement, and decreasing an influence of the shake on an imaging plane in accordance with the shake amplitude so calculated; and
   if it is determined that such displacement cannot be detected, calculating the shake amplitude of the camera body based on the detected shake velocity, and decreasing an influence of the shake on said imaging plane in accordance with the shake amplitude so calculated.

28. A method of camera shake compensation, comprising:
   detecting a shake acceleration when a camera body is shaken;
   determining whether it is possible for relative positional displacement detection means of the camera to detect relative positional displacement of an object to be photographed due to shake of the camera body;
   if it is determined that such displacement can be detected, detecting such displacement, calculating the shake amplitude of the camera body based on the detected displacement, and decreasing an influence of the shake on an imaging plane in accordance with the shake amplitude so calculated; and
   if it is determined that such displacement cannot be detected, calculating the shake amplitude of the camera body based on the detected shake acceleration, and decreasing an influence of the shake on said imaging plane in accordance with the shake amplitude so calculated.

29. A method of camera shake compensation, comprising:
   detecting a shake velocity when a camera body is shaken;
   detecting relative positional displacement of an object to be photographed due to shake of the camera body;
   calculating a shake velocity based on the detected displacement and, when the calculated shake velocity is lower than a predetermined level, modifying a shake amplitude calculation based on the detected shake velocity; and
   decreasing an influence of the shake on an imaging plane according to a result of the modified shake amplitude calculation.

30. A method of camera shake compensation comprising:
   detecting a shake acceleration when a camera body is shaken;
   detecting relative positional displacement of an object to be photographed due to shake of the camera body;
   calculating a shake acceleration based on the detected displacement and, when the calculated shake acceleration is lower than a predetermined level, modifying a shake amplitude calculation based on the detected shake acceleration; and
   decreasing an influence of the shake on an imaging plane according to a result of the modified shake amplitude calculation.

* * * * *